United States Patent [19]

Doroszkowski et al.

[11] 4,081,412

[45] Mar. 28, 1978

[54] COATING COMPOSITIONS

[75] Inventors: Andrew Doroszkowski, Marlow; Peter Francis Nicks, Maidenhead, both of England

[73] Assignee: Imperial Chemical Industries Limited, United Kingdom

[21] Appl. No.: 660,118

[22] Filed: Feb. 23, 1976

[30] Foreign Application Priority Data

Feb. 27, 1975 United Kingdom ................ 8226/75

[51] Int. Cl.$^2$ .......................... C09D 3/66; C09D 5/02
[52] U.S. Cl. .............................. 260/22 CQ; 260/32.4; 260/32.6 R; 260/33.6 EP; 260/33.6 R; 260/37 EP; 260/40 R
[58] Field of Search ............... 260/22 A, 22 CQ, 40 R

[56] References Cited

U.S. PATENT DOCUMENTS

| 3,509,082 | 4/1970 | Mays | 260/22 A |
| 3,804,787 | 4/1974 | Nicks et al. | 260/22 R |
| 3,920,597 | 11/1975 | Nicks et al. | 260/22 R |

FOREIGN PATENT DOCUMENTS 1,086,738  10/1967  United Kingdom ............. 260/22 A

*Primary Examiner*—Ronald W. Griffin
*Attorney, Agent, or Firm*—Cushman, Darby & Cushman

[57] ABSTRACT

A method of producing a paint composition. The composition comprises a pigmented solution of a water-insoluble film-forming base resin in a water-immiscible liquid, the solution of the base resin being emulsifiable in an aqueous synthetic detergent solution. The method of making the paint composition includes the step of treating at least a portion of the pigment in dispersion in water-immiscible liquid with an auxiliary resin which (a) is co-emulsifiable in the aqueous detergent solution with the pigment when dissolved in the water-immiscible liquid of the paint composition and (b) is preferentially adsorbed by the pigment from a solution of both the base resin and the auxiliary resin in the water-immiscible liquid of the paint composition. The pigment of the paint composition comprises a pigment having an acidic surface. The final paint composition is satisfactorily emulsifiable in a 5% by weight solution of a synthetic detergent.

10 Claims, No Drawings

COATING COMPOSITIONS

This invention relates to coating compositions, particularly to decorative paint compositions and to the manufacture of such compositions.

In our U.S. Pat. No. 3,804,787 we have described a method of producing a paint composition, said composition comprising a pigmented solution of a water-insoluble film forming base resin in a water-immiscible liquid and the solution of base resin being completely emulsifiable in the aqueous synthetic detergent solution when the pigment is absent but incompletely co-emulsifiable therein with pigment when the pigment is present, wherein one of the method steps comprises treating at least a proportion of the pigment in dispersion in a water-immiscible liquid with an auxiliary resin which (a) is co-emulsifiable in the aqueous detergent solution with the pigment when dissolved in the water-immiscible liquid of the paint composition and (b) is preferentially adsorbed by the pigment from a solution of both the base resin and the auxiliary resin in the water-immiscible liquid of the paint composition.

In the above mentioned patent we have observed that certain pigments are notably difficult to co-emulsify with the resin in conventional decorative paints carried in water-immiscible diluent but we have referred to a wide range of conventional pigments, extending pigments and fillers which may be used in the method of the invention. We have also referred (see Example 1(d) to the extent of emulsification of the paint with particular reference to a test in which there is employed an aqueous solution of up to 1% by weight of a synthetic detergent. We have since found that whereas a paint comprising base resin and auxiliary resin, both as previously defined, and pigment can be satisfactorily removed from the bristles of a brush using this proportion of synthetic detergent, at higher levels of detergent concentration there may be less satisfactory removal of paint from the brush.

We have now found that this possible disadvantage at higher levels of detergent concentration can be alleviated or overcome when the paint composition comprises a pigment having an acidic surface. In such a case the base resin may or may not be completely emulsifiable in aqueous detergent in the presence of the pigment having the acidic surface according to the emulsification test previously described in which the settlement of an emulsion is assessed.

Thus according to this invention we provide a method of producing a paint composition, said composition comprising a pigmented solution of a water-insoluble film-forming base resin in a water-immiscible liquid and the solution of base resin being emulsifiable in an aqueous synthetic detergent solution, wherein one of the method steps comprises treating at least a proportion of the pigment in dispersion in a water-immiscible liquid with an auxiliary resin which (a) is co-emulsifiable in the aqueous detergent solution with the pigment when dissolved in the water-immiscible liquid of the paint composition and (b) is preferentially adsorbed by the pigment from a solution of both the base resin and the auxiliary resin in the water-immiscible liquid of the paint composition, and wherein the pigment of the paint composition comprises a pigment having an acidic surface, the final paint composition being satisfactorily emulsifiable in a 5% by weight solution of a synthetic detergent as herein defined.

The invention also provides a paint composition which comprises a solution of a water-insoluble film-forming base resin in a water-immiscible liquid, an auxiliary resin and a pigment having an acidic surface, the paint composition being satisfactorily emulsifiable in a 5% by weight solution of a synthetic detergent as herein defined.

The invention further provides a method of cleaning a paint applicator contaminated with a paint composition as defined above wherein the paint is emulsified in an aqueous solution of a detergent, preferably a synthetic detergent, by agitation therein.

By a pigment having an acidic surface we mean that, due to the nature of the pigment surface, the pigment has a zero zeta potential at a pH of less than 3.5 and preferably the pigment has a zero zeta potential of pH 3.0 or less. The measurement of the point of zero zeta potential of pigments has been discussed by Parfitt in the Journal of the Oil and Colour Chemists Association, (1971), at pages 356 – 362.

The acidity of a pigment surface can be further characterised by an examination of the plot of electrophoretic mobility against pH when the pigment is dispersed in a suitable medium, as discussed by Parfitt in Croatica Chemica Acta 45, (1973), 189 – 194. The acidic nature of a pigment surface can be confirmed by X-ray photoelectric spectroscopy.

Pigments having an acidic surface are normally prepared by coating a conventional pigment for example rutile or anatase titanium dioxide, with an acidic or acid generating substance. In this specification the term pigment includes extenders and fillers and examples of other pigments which may have an acidic surface include the iron oxides whether black, yellow, red or brown; chrome oxide green; phthalocyanine blue; phthalocyanine green; red lead; cobalt blue; graphite; vegetable carbon black; mineral carbon black; metallic aluminium; metallic lead; metallic zinc; white lead sulphate, white lead carbonate; zinc oxide, extending pigments and fillers include barium sulphate; calcium carbonate; magnesium carbonate; calcium silicate; and silica.

An acidic coating can be produced, for example, by treating a conventional pigment with silica using sodium silicate, or with an alkyl silicate or silicon tetrachloride, followed by hydrolysis of these materials to deposit silica on the pigment surface.

Suitable commercially available pigments which have an acid surface include rutile titanium dioxide sold as Tioxide RXL (Tioxide International) which has a zero zeta potential at pH less than 3, and lead chrome when sold as Middle Chrome E-HG (ICI Organics Division) which has a zero zeta potential at pH less than pH 3.5.

Particularly suitable pigments are those which are coated substantially wholly with silica and those pigments which are initially coated with alumina and subsequently coated substantially wholly with silica. Methods of producing pigment which have an acidic surface are given, for example in U.S. Pat. No. 2,885,366 and in Croatica Chemica Acta 1973, 45, 193.

Since many acidic pigments are commonly recommended for use in water based decorative paints, for example emulsion paints, due to their improved dispersibility in an aqueous medium, it was surprising that these pigments were particularly suitable in the production of paints described in our earlier patent which are based on a water-immiscible liquid.

Pigments having an acidic surface as herein defined are advantageous in the manufacturing method and in the resulting paints which are described in our earlier patent since these paints are then readily cleaned from an applicator such as a bristle brush by aqueous solutions which contain a high proportion of a synthetic detergent, for example a higher proportion than that which is necessary to clean the brush. A wide range of synthetic detergents may be used in cleaning applicators which contain such paints for example sodium dodecyl benzene sulphonate, nonyl phenol/ethylene oxide condensates, and sodium or ammonium salts of sulphate esters of nonyl phenol/ethylene oxide condensates and we have found that bristle brushes can be satisfactorily cleaned when there is employed an aqueous solution containing up to 5% by weight or even more of a synthetic detergent.

The pigment having an acidic surface may be used in paint compositions according to the invention in conjunction with other pigments which may or may not also have an acidic surface. The pigment having an acidic surface may be incorporated into the paint in the manner described in our earlier patent for example by initial dispersion with a proportion of the total resin to be used in the paint. We have observed that improved paints may be obtained whether the pigment with acidic surface is initially treated with auxiliary resin or not, and that the relative extent to which the auxiliary resin and the base resin are adsorbed by the pigment appears to be less critical than when the pigment is not acidic.

Particularly suitable base resins for use in the invention are those which contain air drying moieties, particularly drying oil moieties for example drying oil-modified alkyd resins, drying oil-modified polyurethane resins, drying oil-modified polyamide resins and oil-modified epoxy esters. Particularly suitable auxiliary resins are those which comprise poly(ethylene glycol) moieties. These moieties may be introduced into a wide range of resins for example alkyd resins, polyamide resins, polyester resins and polyurethane resins.

Preferably, when the paint comprises a base resin which is a drying oil-modified alkyd resin, the auxiliary resin is a poly(ethylene glycol) - modified alkyd resin which comprises poly(ethylene glycol) of molecular weight 200–1000, a high acid value oil modified alkyd or a high hydroxyl value oil-modified alkyd resin.

The present invention is particularly appropriate to paints which contain highly condensed alkyd resins, bodied oils and thixotropic paints which are modified for example by polyamide resins.

The disclosure of U.S. Pat. No. 3,804,787 is included herein by this reference thereto.

The invention is illustrated by the following Examples in which parts and percentages are by weight.

EXAMPLE 1

In this Example a comparison is made between the behaviour of two rutile titanium dioxide pigments when dispersed in paint, one pigment (A) having an acidic surface according to the invention and another pigment (B) having a surface not according to the invention.

(a) 278 parts of pigment A, a silica coated rutile titanium dioxide commercially available as Tioxide RXL (Tioxide International Limited) were finely dispersed in a blend of 33 parts of a poly(ethylene glycol)-modified alkyd resin and 43.4 parts of a 68% oil length soya bean oil-modified alkyd resin and 107 parts of white spirit. Both resins were of 75% solids content in white spirit. The poly(ethylene glycol)-modified alkyd resin was prepared by reacting pentaerythritol/poly(ethylene glycol) molecular weight 660/phthalic anhydride/soya bean oil = 1/1.2/3.2/1 molar to an acid value of 8–10 and a hydroxyl value of 5–10. The poly(ethylene glycol) was present in the resin at a weight percentage of 40%. The 68% oil length alkyd was prepared from soya bean oil/phthalic anhydride/pentaerythritol = 1/2/1 molar.

Pigment A had a surface acidity which is defined by a zero zeta potential at pH less than 3.

The resulting millbase was mixed with a further 153 parts of the 68% oil length alkyd resin, 230 parts of a thixotropic alkyd resin commercially available as Modulac 135W (ICI Organics Division) and small proportions of lead and cobalt napthenate as driers.

(b) Another paint similar to that prepared in (a) was also prepared except that in preparing the millbase there was used 300 parts of pigment B, an alumina coated pigment commercially available as Tioxide RCR-6 (Tioxide International Limited) and 57 parts of white spirit. Pigment B had a surface which is defined by a zero zeta potential at pH greater than 3.5.

(c) The paints prepared in (a) and (b) above were tested for their ability to emulsify in certain detergent solutions and for the ease with which they were removed from a bristle brush.

(i) Both paints satisfied the emulsification test described in Example 1(d) of the earlier U.S. patent application No. 3,804,787.

(ii) A further emulsification test, which simulated the use of an excess of detergent, was devised as follows:

30 parts of sodium dodecyl benzene sulphate, 10 parts of an adduct nonyl phenol/8 mols ethylene oxide and 10 parts of the sodium or ammonium salt of the sulphate ester of an adduct nonyl phenol/5.5 mols ethylene oxide were first dissolved in 50 parts of a 4/1 blend by weight of water/ethanol. 6 parts of each paint prepared in (a) and (b) above were then emulsified with vigorous stirring in two detergent mixtures as follows:

1% solution of detergent:
2 parts of the above detergent mixture were dissolved in 198 parts of water at 40° C. When emulsified in this solution both paints (a) and (b) had good stability, (there was substantially no settlement after 30 mins) the emulsion droplets were fine and pigment was seen to be present in the aqueous phase.

5% solution of detergent:
10 parts of the above detergent mixture were dissolved in 190 parts of water at 40° C. When emulsified in this solution paint (b) had poor stability (there was substantial settlement after 10 mins), the emulsion droplets were coarse and no pigment was observed in the aqueous phase. On the other hand paint (a) containing a pigment according to the invention behaved as in the 1% solution of detergent and gave a stable emulsion in which pigment was present in the aqueous phase.

(iii) In a practical brush-cleaning test two standard brushes of 2 inch width were filled with paints (a) and two more brushes were filled with paint (b) so that 20g of paint was retained in each case. The brushes were allowed to stand for 30 minutes and paints (a) and (b) then cleaned by vigorous plunging in 600g of either 1% or 5% detergent solution at 40° C. Traces of paint adhering to the outside of the brush were removed, the bristles rinsed in cold water and then dried. No paint remained on the brushes in the case of the 1% solutions. In the case of the 5% solutions the brush containing paint (a) was very clean whereas the bristles of the brush containing paint (b) were coated with a thin film of pigmented paint which could not be readily removed.

EXAMPLE 2

When Example 1 was repeated using as the auxiliary resin an alkyd resin of acid value 130 mgKOH and hydroxyl value 40 mgKOH/g, which was prepared from pentaerythritol/dimethylol propionic acid/adipic acid/linseed oil fatty acid = 1.15/0.5/5/3, similar results were obtained in the tests of 1(c).

EXAMPLE 3

In this Example paints similar to those of Examples 1(a) and (b) were prepared except that in (a) there was used 453 parts of a silica-coated lead chrome pigment commercially available as Middle Chrome E-HG (ICI Organics Division) together with 57 parts of white spirit, and in (b) 446 parts of an uncoated lead chrome pigment commercially available as Middle Chrome A-HG (ICI Organics Division) together with 53 parts of white spirit. Middle Chrome E-HG had an acidic surface in accordance with the invention.

Paints 2(a) and 2(b) behaved in a manner similar to paints 1(a) and 1(b) when tested as described in Example 1.

EXAMPLE 4

A paint was prepared according to the method of Examale 1(a) except that the pigment was an alumina-coated rutile titanium dioxide which had been given an additional coating of silica equivalent to 6% of the weight pigment by the method described by Parfitt in Croatica Chemica Acta 1973, 45, 193. This pigment then had an acidic surface in accordance with the invention.

This paint behaved in a manner similar to paint 1(a) when subjected to the tests described in Example 1.

EXAMPLE 5

Two paints were prepared according to the method and using the ingredients of Example 1(a) except that the rutile titanium dioxide employed in one case had been surface-treated to provide a coating consisting of 1.5% $Al_2O_3$ and 2.8% $SiO_2$, each by weight based on the weight of titanium dioxide and in the other case 2.5% $Al_2O_3$ and 4.5% $SiO_2$.

Both pigments had a surface acidity defined by a zero zeta potential at pH less than 3.5.

Both paints equalled the performance of paint (a) in the tests (i), (ii) and (iii) of Example 1 and both paints provided a coating of high gloss.

We claim:

1. A method of producing a paint composition, said composition comprising a pigmented solution of a water-insoluble film-forming base resin in a water-immiscible liquid and the solution of base resin being emulsifiable in an aqueous synthetic detergent solution, wherein one of the method steps comprises treating at least a proportion of the pigment in dispersion in a water-immiscible liquid with an auxiliary resin which (a) is co-emulsifiable in the aqueous detergent solution with the pigment when dissolved in the water-immiscible liquid of the paint composition, and (b) is preferentially adsorbed by the pigment from a solution of both the base resin and the auxiliary resin in the water-immiscible liquid of the paint composition, and wherein the pigment of the paint composition comprises a pigment having an acidic coating, the coating surface having a zero zeta potential at a pH of less than 3.5, the final paint composition being satisfactorily emulsifiable in a 5% by weight solution of a synthetic detergent.

2. A method according to claim 1 wherein the acidic coating surface exhibits a zero zeta potential at a pH of less than 3.0

3. A method according to claim 1 wherein the coating of the acidic pigment (which exhibits a zero zeta potential at a pH of less than 3.5) comprises silica.

4. A method according to claim 1 wherein the acidic pigment is a coated titanium dioxide.

5. A method according to claim 1 wherein the base resin comprises a drying oil-modified alkyd resin.

6. A method according to claim 1 wherein the auxiliary resin comprises a resin selected from a poly(ethylene glycol)-modified alkyd resin, a high acid value alkyd resin or a high hydroxyl value alkyd resin.

7. A method according to claim 1 wherein the base resin comprises a polyamide-modified drying oil modified alkyd resin.

8. A paint composition prepared by a method according to claim 1.

9. A method as set forth in claim 1 wherein the coating surface also includes alumina.

10. A paint composition which comprises a solution of a water-insoluble film forming base resin and an auxiliary resin in a water-immiscible liquid, and a pigment having an acidic coating, the coating surface having a zero zeta potential at a pH of less than 3.5, the paint composition being satisfactorily emulsifiable in a 5% by weight solution of a synthetic detergent.

* * * * *